(12) United States Patent
Brenden et al.

(10) Patent No.: US 6,285,149 B1
(45) Date of Patent: Sep. 4, 2001

(54) DOUBLE SAMPLED PHASE DETECTOR CIRCUIT

(75) Inventors: Jason P. Brenden; Michael J. Peterson, both of Eagan, MN (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/415,289

(22) Filed: Oct. 8, 1999

Related U.S. Application Data
(60) Provisional application No. 60/143,492, filed on Jul. 12, 1999.

(51) Int. Cl.$^7$ ........................................................ H02P 7/50
(52) U.S. Cl. ................................................ 318/439; 318/254
(58) Field of Search ................................. 318/138, 439, 318/254, 799, 800, 801, 805, 806

(56) References Cited

U.S. PATENT DOCUMENTS

| | | | |
|---|---|---|---|
| 4,490,661 | * 12/1984 | Brown et al. | 318/661 |
| 5,187,419 | * 2/1993 | DeLange | 318/805 |
| 5,420,492 | * 5/1995 | Sood et al. | 318/809 |
| 5,448,149 | * 9/1995 | Ehsani et al. | 318/701 |
| 5,457,375 | * 10/1995 | Marcinkiewicz et al. | 318/802 |
| 5,821,708 | * 10/1998 | Williams et al. | 318/254 |
| 5,825,145 | * 10/1998 | Pham et al. | 318/439 |

OTHER PUBLICATIONS
Kenjo, Tak, Electric Motors and Their Controls: An Introduction, 1991, pp. 134–136.

* cited by examiner

*Primary Examiner*—Bentsu Ro
*Assistant Examiner*—Rina I. Duda
(74) *Attorney, Agent, or Firm*—Kinney & Lange, P.A.

(57) ABSTRACT

A motor drive circuit for a three-phase motor includes a commutator that provides a driving voltage to the motor from a DC voltage source. A sequencer operates the commutator to pulse width modulate the source voltage so that the driving current has a continuously variable waveform, such as a sinusoidal waveform. The sequencer is responsive to an error signal from a phase detector to align the driving voltage waveform with a motor current waveform. The phase detector includes a sensor that senses the motor current and provides a voltage input to first and second sample circuits. The first sample circuit provides a plurality of samples of respective instantaneous values of the sensed voltage, and the second sample circuit provides a sample of a selected instantaneous value of the sensed voltage. An error generation circuit provides an error signal based on a difference between the second sample and each of the plurality of first samples.

20 Claims, 3 Drawing Sheets

DOUBLE SAMPLED PHASE DETECTOR CIRCUIT

CROSS-REFERENCE TO RELATED APPLICATION(S)

This application claims priority of Provisional Application No. 60/143,492 filed Jul. 12, 1999.

BACKGROUND OF THE INVENTION

Hall-effect sensors are commonly used to monitor the radial position of the spindle motor of a hard disk drive. The radial position information is provided to a controller to operate a motor commutator at the correct time, to thereby maintain rotation of the motor and disks thereon at a predetermined rotational velocity. These Hall-effect sensors added additional cost and circuit board space to the hard drive system. Consequently a simpler and less expensive technique was developed using the back electromotive force (BEMF) generated by the motor with a six-state commutation. The six-state commutator operates a three-phase spindle motor to drive one winding high, one winding low, and one winding is left undriven. The BEMF voltage of the undriven winding provides radial motor position and speed information to the controller.

There are some drawbacks with the six-state commutation. Torque ripple leads to audible resonance and reduced efficiency, causing the motor speed to vary, which can also create a force on the disk drive assembly. If there is a mechanical resonance of the disk drive assembly that is close in frequency to the harmonics of this force, an audible noise results which can affect the acoustic performance of the drive. Driving the three windings of the motor with appropriate waveforms can minimize torque ripple. If the torque profile for each stator motor coil is sinusoidal, each motor terminal should be driven with a sinusoidal signal to create a flat torque waveform. A sinusoidal driving current can be accomplished by pulse width modulating the DC source voltage during each of the three phases. Sinusoidal pulse width modulation requires all three windings be driven simultaneously, with one winding being driven high and the other two windings being modulated by driving them high or low or not at all to shape the driving signal. See, for example, T. Kenjo, *Electric Motors and Their Controls*, Oxford Press, (1991), pp 143–136. However, with all three windings being driven simultaneously, it is not possible to detect the rotational position of the motor. Consequently, motor position information must be obtained from some other source.

One technique for detecting motor position with pulse width modulated driven motors is to sample the maximum motor current when only one of the windings is driven high and using that sample to detect the phase of the motor current in relation to the driving signal. To assure sampling is of the maximum motor current, motor current sampling is performed only when two windings are driven low. However, the sample signal carries a DC component which adversely affects operation of the apparatus. Consequently, there is a need for a phase detector that eliminates the DC component of the sample signal.

BRIEF SUMMARY OF THE INVENTION

In one form of the invention, a motor drive circuit for a three-phase motor includes a commutator that provides a driving voltage to the motor from a DC voltage source. A sequencer operates the commutator to pulse width modulate the source voltage so that the driving current has a continuously variable waveform, such as a sinusoidal waveform. The sequencer is responsive to an error signal from a phase detector to align the driving voltage waveform with a motor current waveform. The phase detector includes a sensor and first and second sample circuits. The sensor senses a voltage representative of the motor current and provides the voltage to the first and second sample circuits. The first sample circuit provides a plurality of first samples of respective instantaneous values of the sensed voltage during a single phase of the motor current, and the second sample circuit provides a second sample of a selected instantaneous value of the sensed voltage. A difference circuit subtracts the second sample from each of the plurality of first samples, and an error generation circuit provides the error signal based on the plurality of differences.

In the preferred embodiment, the commutator is a six-state commutator having three pairs of switches, each pair comprising an upper switch for connecting the DC voltage source to an individual one of three windings of the motor and a lower switch for connecting the winding to the sensor. The sequencer operates the commutator so that respective ones of the upper switches supply source voltage to a respective winding during a respective 120° rotational phase of the motor, the sequencer further selectively operating up to two lower switches and up to two upper switches from the pairs that do not include the operated upper switch to pulse width modulate the source voltage thereby generating the driving voltage, with only one switch from a pair being operated at any one time. The first sample circuit includes a first sample switch and a first capacitor, and the second sample circuit includes a second sample switch and a second capacitor. The first sample switch is operated a plurality of intervals during each phase of the motor to store a voltage in the first capacitor representative of successive instantaneous values of the sense voltage. The second sample switch is operated during a selected interval during the motor phase to store a voltage in the second capacitor representative of a selected instantaneous value of the sense voltage, which represents the DC value of the motor current. The difference circuit operates to subtract the voltage stored in the second capacitor from the voltage stored in the first capacitor. Preferably, the first and second sample switches are operated by the sequencer upon a selected simultaneous operation of two lower switches.

Another aspect of the present invention resides in a process of operating a three-winding motor in which a DC voltage is commutated to provide a continuously variable driving current to the motor. A voltage representative of motor current is sensed while providing the driving voltage to one winding of the motor. A plurality of instantaneous values of the sensed voltage are sampled and one of the sampled instantaneous values is selected. The selected value is subtracted from each of the plurality of values to derive an error signal. The voltage phase is adjusted based on the error signal to align the voltage phase with the current phase. Preferably, the selected instantaneous value is approximately representative of a DC component of the motor current, so the error signal is free of a DC offset.

DETAILED DESCRIPTION

Figure 1:
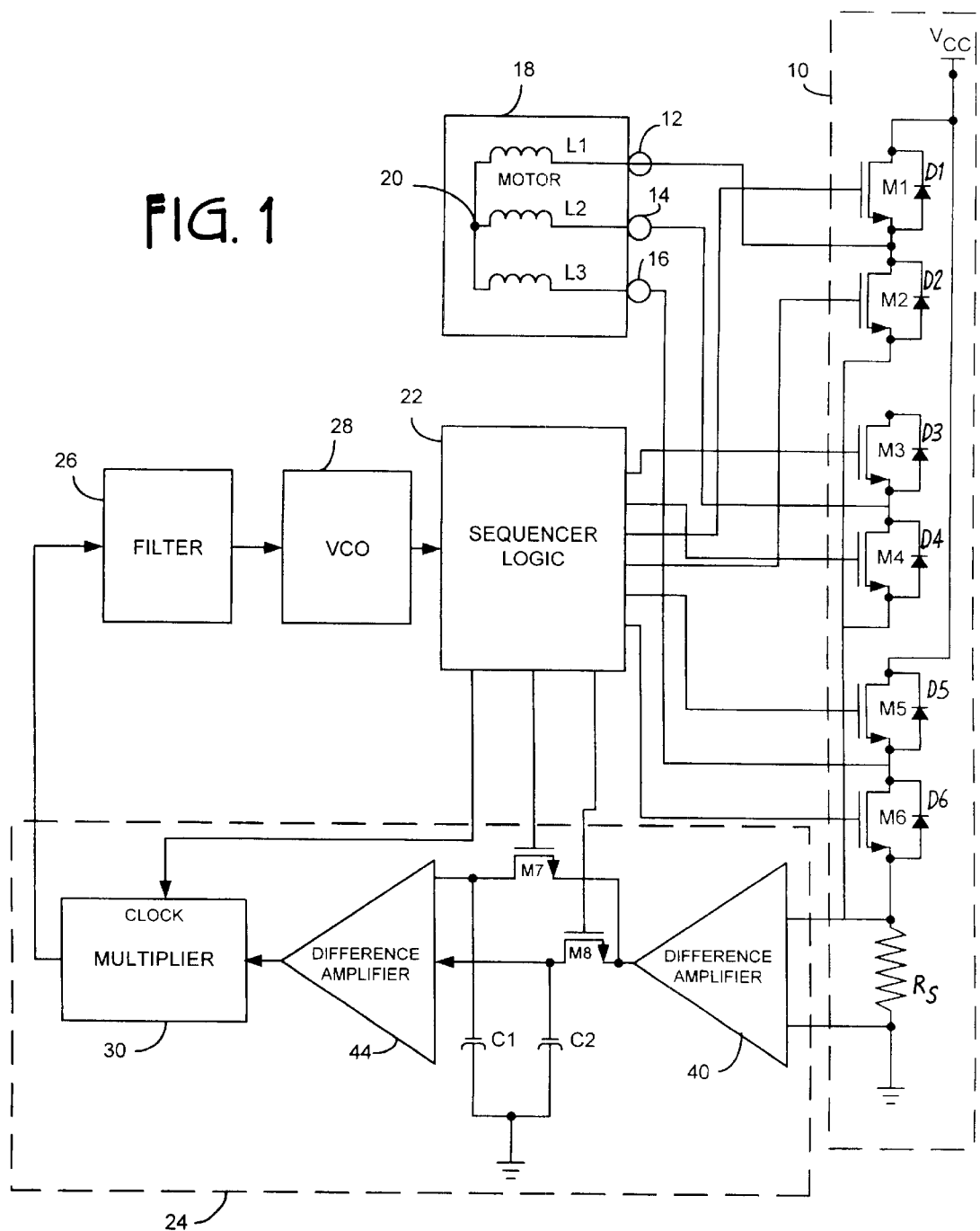
FIG. 1 is a block diagram of apparatus according to the present invention.

FIG. 1 is a block circuit diagram of the apparatus embodying the present invention. The apparatus includes a six-state commutator 10 containing MOSFET commutator switches M1–M6 providing a three-phase output to terminals 12, 14 and 16 of three-phase motor 18. MOSFETs M1–M6 include inherent diodes D1–D6. Motor 18, which is the disk spindle motor of a disk drive, includes three windings L1, L2 and L3 each connected between a common node 20 and a respective terminal 12, 14 and 16. Sequencer logic 22 is connected to the gates of MOSFETs M1–M6 to operate the MOSFETs to supply power from source $V_{CC}$ to selected ones of terminals 12, 14 and 16 of motor 18 and to connect selected others of terminals 12, 14 and 16 to ground through sense resistor $R_S$. Sequencer logic 22 is synchronized to the motor operation by phase detector 24, filter 26 and voltage controlled oscillator (VCO) 28.

Sequencer 22 operates the commutator switches M1–M6 to apply power from supply $V_{CC}$ to operate motor 18 in the operational mode of the motor to rotate the discs (not shown) attached to the motor. An overly simple operation of sequencer 22 operates upper switches M1, M3 and M5 during a first set of mutually exclusive 120° phases, and operates lower switches M2, M4 and M6 during a second set of mutually exclusive 120° phases, with the two phase sets being offset. Thus, during each 60° phase a different pair of switches is operated so that motor drive current is supplied from $V_{CC}$ to a terminal at one stator coil and from a terminal of another stator coil through sense resistor $R_S$ to ground. Where the DC supply voltage is commutated to drive one terminal high, one low and one is undriven, the driving current is approximately a square waveform. However, to achieve a continuously varying driving signal, such as a sinusoidal signal, both lower switches are pulsed on at programmed intervals during the 120° high phase, and the other two upper switches are also pulsed on, with the caveat that the upper and lower switches for a given motor terminal are never both on. The result is the pulse width modulation of the supply voltage which is filtered by the inductance of the motor winding to derive a current waveform that is more continuously variable, such as sinusoidal. Consequently, and as more fully explained in the aforementioned Kenjo work, during the 120° phase that the upper switch (e.g., switch M1) is operated to a given motor terminal, the lower switches (e.g., switches M4 and M6) and upper switches (e.g., switches M3 and M5) of the other two terminals are operated to pulse width modulate the DC power signal $V_{CC}$ to shape the signal to an approximate sinusoid or other waveform matching the torque profile.

Sense resistor $R_S$ is in series with the commutator MOSFETs to monitor current through motor 18. The current through sense resistor $R_S$ provides a voltage across the sense resistor which is the input to phase detector 24. Difference amplifier 40 supplies that voltage through MOSFET M7 to charge capacitor C1. A sample signal from sequencer logic 22 operates MOSFET M7 to conduction to charge capacitor C1 to the instantaneous voltage value across sense resistor $R_S$.

When only one upper MOSFET M1, M3 or M5 is operated, current flows from source $V_{CC}$ through the one operated upper MOSFET M1, M3 or M5, through the associated stator coil L1, L2 or L3 to common node 20, thence through another coil or coils and its/their associated operated lower MOSFET(s) M2, M4 or M6, through sense resistor $R_S$, to ground. Under these conditions, sense resistor $R_S$ is supplied with the maximum motor current. However, pulse width modulating power to the motor may operate a second upper MOSFET during various intervals. Under these conditions, current from the first coil loops back through the second MOSFET to reduce the maximum motor current. Consequently, current through sense resistor $R_S$ is less than the maximum motor current.

It is important that capacitor C1 be charged to a voltage representing the instantaneous maximum motor current. Maximum motor current occurs when a given phase current passes though its associated upper switch, such as switch M1 and the associated coil L1, and is not diverted through another upper switch, such as switch M3 or M5. Moreover, neither switch M3 or M5 will be operated if their associated lower switches M4 and M6 are operated. Accordingly, the sample signal from sequencer logic 22 to operate MOSFET M7 is provided only when two lower switches (M4 and M6, in the example) are operated. In a preferred embodiment of forming the continuously variable driving signal, two lower switches of the commutator are simultaneously operated about twenty times during the 120° phase of an upper switch. Consequently, MOSFET M7 is operated a plurality of times (e.g., twenty times) during each repeating voltage waveform across resistor $R_S$. Capacitor C1 charges to the instantaneous voltage value of each of the twenty samples of the waveform across resistor $R_S$. As a result, the motor current is sampled and a voltage representative of the instantaneous motor current is applied to multiplier 30 twenty times over the duration of the waveform. The sampled waveform signals are multiplied by a clock signal 32 (FIG. 2) from sequencer logic 22 which is synchronized to the signal operating the commutator switches M1–M6, and hence is synchronized to the motor driving voltage. Clock signal 32 has a 50% duty cycle and a period equal to the duration of a 120° phase of operation of an upper switch M1, M3 or M5.

The multiplied signals have the general shape of a repeating "humped" waveform of cos (θ) $\{-\pi/3 \leq 0 \leq \pi/3\}$, which is evenly balance when the motor BEMF is in phase with the driven waveform, and which slides earlier or later down the sinusoid if the driven waveform is out of phase with the motor BEMF. The "hump" has a period equal to the period of clock signal 32, and hence equal to the 120° phase operation of an upper switch M1, M3 or M5. The output signal from multiplier 30 is filtered by filter 26 and applied to VCO 28 to alter the frequency of the VCO, which in turn operates sequencer logic 22 to adjust the timing of operation of MOSFET switches M1–M6 which in turn synchronizes the commutator to the motor.

Figure 2:
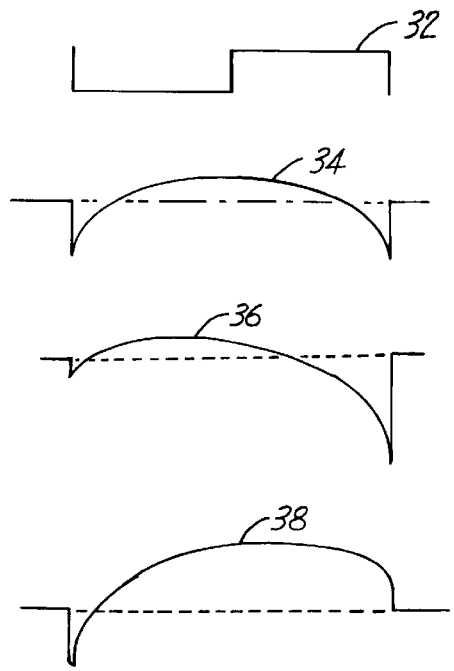
FIG. 2 are waveforms useful in explaining certain principles of operation of the apparatus illustrated in FIG. 1.

As shown in FIG. 2, the shape of the humped waveform is dependent on whether the motor current leads, trails or is in time with the driving voltage, over the clock cycle of the multiply clock signal 32. If the current is in phase with the driving voltage, the filtered error detector signal 34 averages zero, leaving the VCO frequency unchanged. If the motor current leads the driving waveform, the filtered error signal 36 averages negative, thereby decreasing the VCO frequency, causing sequencer 22 to alter the timing of operation of switches M1–M6 until the motor current move into phase with the driving voltage. If the motor current trails the driving waveform, the filtered error detector signal 38 averages positive, increasing the frequency of the VCO, causing the motor current to move into phase with the driving voltage. The VCO frequency is thus controlled to operate sequencer logic 22 until the humped waveform becomes symmetric and therefore aligns the driving voltage waveform with the motor BEMF.

Figure 3A:
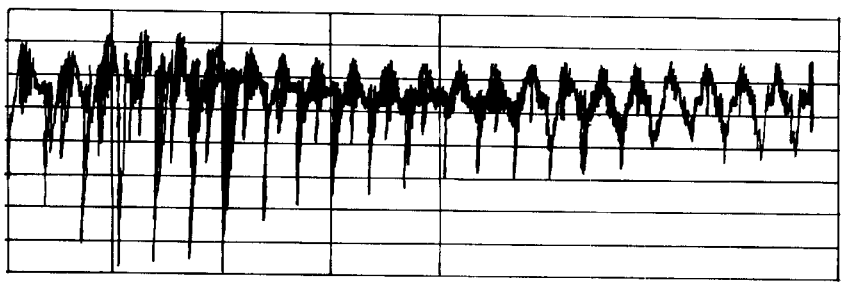
FIGS. 3A and 3B are waveforms of signals in apparatus employing single sampled phase detection.
Figure 3B:
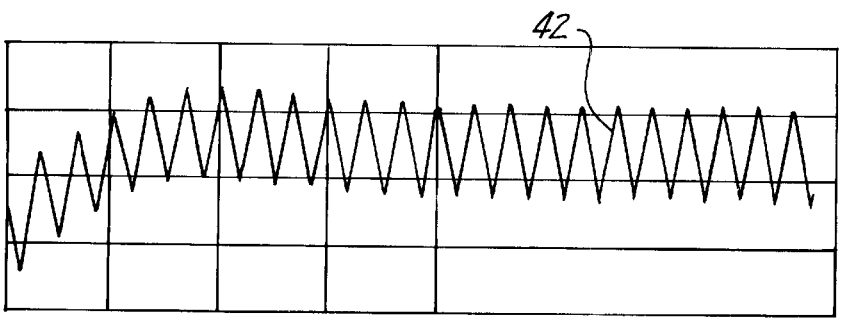

One problem with the phase detection described above is that a large DC component may be present on the sampled waveform, thus providing a large DC offset to the motor current. The DC offset is multiplied and filtered with the sampled signals, causing the filtered output signal to have a relatively large ripple. FIG. 3A illustrates the sampled signal input to multiplier 30 (e.g., the voltage on capacitor C1). As shown in FIG. 3B, the output of filter 26 may have significant ripple, particularly after the sequencer logic has synchronized the signal and the phase detector senses the synchronization of the motor current and driving voltage, as illustrated at 42. This ripple can vary the oscillator frequency, which can distort the sinusoidal pulse width modulated driving current and result in poor acoustic performance of the disk drive. The present invention additionally samples the "humped" waveform at a point in its period that is equal to the average or DC offset value of the signal. This second sampled signal is used as a reference to the aforementioned sampled signal. The DC offset is removed by the difference between these two sampled signals, thereby reducing ripple on the filter output. This second sample signal is achieved with MOSFET switch M8, capacitor C2 and difference amplifier 44.

Sense resistor $R_S$ senses the current through the motor and provides a voltage which is amplified by difference amplifier 40 and is applied to MOSFETs M7 and M8. The output voltage of amplifier 40 is sampled while current flows through the sense resistor, which occurs when both of the other two lower MOSFETs are turned on. The gate of switch M7 is driven by a sample signal from the sequencer logic and is turned on at the proper time, allowing capacitor C1 to be charged to the instantaneous voltage at the output of amplifier 40. The charging of capacitor C1 occurs plural times per hump period (e.g., twenty sample periods per hump period), as described above. The sequencer logic also drives the gate of switch M8, which is turned on during only one sample period during the "humped" waveform. If there are twenty sample periods per hump in the waveform used to create the pulse width modulation pulses, switch M8 will be turned on during only one of the sample periods while switch M7 is also turned on. For example, if the approximate DC value of the sense voltage from amplifier 40 is reached at the fifth sample cycle, switch M7 is turned on only during that fifth sample cycle. As a result, capacitor C2 is charged to the average DC value of the "humped" waveform.

The voltages on capacitors C1 and C2 are applied to difference amplifier 44 which subtracts the voltage on capacitor C2 from that on capacitor C1, thereby effectively removing the DC component of the input signal at amplifier 40. The difference voltage is input to multiplier 30, which operates filter 26 to drive VCO 28 and sequencer logic 22 to synchronize the motor current and driving voltage as described above.

Figure 4A:
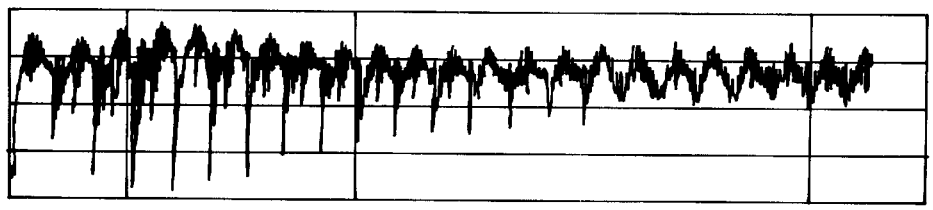
FIGS. 4A, 4B and 4C are waveforms of signals in the apparatus illustrated in FIG. 1.
Figure 4B:
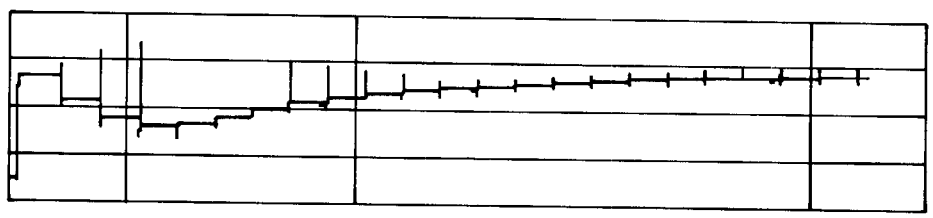
Figure 4C:
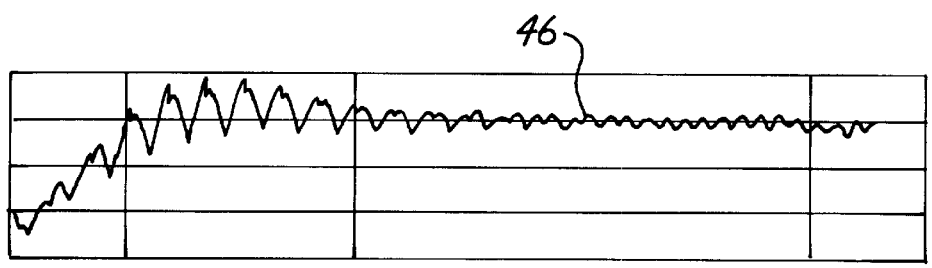

As a result of the double sampling, the signal into multiplier 30 has a very small DC component and thus the signal from filter 26 has about 12.6 times less ripple for pure sinusoids than if the DC component was not removed. This results in the output of the VCO being more constant and therefore results in sinusoidal driving waveforms that are less distorted. The waveforms on capacitors C1 and C2 (inputs to amplifier 44) are illustrated in FIGS. 4A and 4B, respectively, and the waveform of the output of filter 26 is illustrated in FIG. 4C. FIG. 4A is the same as FIG. 3A. As shown in FIG. 4B, when a steady state condition is achieved, the voltage on capacitor C2 remains relatively constant and equal to the average value of the voltage on capacitor C1. As shown particularly at 46 in FIG. 4C, ripple in the output signal from filter 26 is nearly eliminated during a steady state condition.

Although the present invention has been described with reference to preferred embodiments, workers skilled in the art will recognize that changes may be made in form and detail without departing from the spirit and scope of the invention.

What is claimed is:

1. A motor drive circuit for a three-phase motor, the motor drive circuit including a commutator arranged to provide a driving voltage to the motor from a DC voltage source, a sequencer operating the commutator to pulse width modulate the source voltage so that a motor current has a continuously variable waveform, the sequencer being responsive to an error signal to align the driving voltage with the motor current waveform, and a phase detector supplying the error signal to the sequencer comprising:

a sensor providing a sense voltage representative of the motor current;

a first sample circuit providing a plurality of first samples of respective instantaneous values of the sense voltage;

a second sample circuit providing a second sample of a selected instantaneous value of the sense voltage; and an error generation circuit providing the error signal based on a difference between the second sample and each of the plurality of first samples.

2. A motor drive circuit for a three-phase motor, the motor drive circuit including a commutator arranged to provide a driving voltage to the motor from a DC voltage source which is a six-state commutator having three pairs of switches, each pair comprising an upper switch for connecting the DC voltage source to an individual one of three windings of the motor and a lower switch for connecting the one of three windings to the sensor, a sequencer operating the commutator to pulse width modulate the source voltage so that a motor current has a continuously variable wave form through the sequencer operating the commutator so that respective ones of the upper switches supplies source voltage to a respective winding during a respective 120° rotational phase of the motor, the sequencer further selectively operating up to two lower switches and up to upper switches from the pairs that do not include the operated upper switch to pulse width modulate the source voltage thereby generating the driving voltage, only one switch from a pair being operated at any one time, the sequencer being responsive to an error signal to align the driving voltage with the motor current wave form, and a phase detector supplying the error signal to the sequencer comprising:

a sensor providing a sense voltage representative of the motor current;

a first sample circuit providing a plurality of first samples of respective instantaneous values of the sense voltage which includes a first sample switch and a first capacitor, the first sample switch operating during a plurality of intervals during a motor phase to store voltages in the first capacitor representative of successive instantaneous values of the sense voltage;

a second sample circuit providing a second sample of a selected instantaneous value of the sense voltage which includes a second sample switch and a second capacitor, the second sample switch operating during a single interval during the motor phase to store a voltage in the second capacitor representative of a selected instantaneous value of the sense voltage; and an error generation circuit providing the error signal based on a difference between the second sample and each of the plurality of first samples.

3. Apparatus according to claim 2, wherein the sequencer operates the first sample switch for a plurality of intervals during each motor phase and operates the second sample switch during one of the intervals during each motor phase that the first sample switch is operated.

4. Apparatus according to claim 3, wherein the first and second sample switches are operated upon simultaneous operation of two lower switches for the motor phase.

5. Apparatus according to claim 3, wherein the error generation circuit includes a difference circuit to subtract the voltage stored in the second capacitor from the voltage stored in the first capacitor.

6. Apparatus according to claim 5, further including a filter for filtering the voltage from the difference circuit.

7. Apparatus according to claim 3, wherein the second sample switch is operated when the sense voltage value is approximately representative of a DC component of the motor current.

8. Apparatus according to claim 2, wherein the error generation circuit includes a difference circuit to subtract the voltage stored in the second capacitor from the voltage stored in the first capacitor.

9. Apparatus according to claim 8, further including a filter for filtering the voltage from the difference circuit.

10. Apparatus according to claim 2, wherein the second sample switch is operated when the sense voltage value is approximately representative of a DC component of the motor current.

11. Apparatus according to claim 2, wherein the sequencer operates the first sample switch for a plurality of intervals during each motor phase and operates the second sample switch during one of the intervals during each motor phase that the first sample switch is operated.

12. Apparatus according to claim 1, wherein the second sample circuit is operated when the sense voltage value is approximately representative of a DC component of the motor current.

13. A motor drive circuit for a three-phase motor, the motor drive circuit including a commutator arranged to provide a driving voltage to the motor from an DC voltage source, a sequencer operating the commutator to pulse width modulate the source voltage so that a motor current has a continuously variable wave form, the sequencer being responsive to an error signal to align the driving voltage with motor current wave form, and a phase detector supplying the error signal to the sequencer comprising:

a sensor providing a sense voltage representative of the motor current;

a first sample circuit providing a plurality of first samples of respective instantaneous values of the sense voltage through the sequencer operating a first sample switch for a plurality of intervals during each motor phase;

a second sample circuit providing a second sample of a selected instantaneous value of the sense voltage through the sequencer operating a second sample switch during one of the intervals during each motor phase that the first sample switch is operated; and an error generation circuit providing the error signal based on a difference between the second sample and each of the plurality of first samples.

14. A method of operating a three-winding motor comprising:

commutating a DC voltage to provide a driving voltage having a voltage phase, the windings of the motor generating a continuously variable driving current;

sensing a voltage representative of motor current while providing the driving voltage to one winding of the motor, the motor current having a current phase;

sampling plurality of instantaneous values of the sensed voltage;

selecting one of the sampled instantaneous values;

deriving an error signal based on a difference between the selected one value and each of the plurality of values; and adjusting the voltage phase based on the error signal to align the voltage phase with the current phase.

15. The method of claim 14, wherein the selected one of the sampled instantaneous values is approximately representative of a DC component of the motor current.

16. The method of claim 14, wherein the step of deriving the error signal includes subtracting the selected one value from each of the plurality of values to derive a plurality of difference values, and filtering the plurality of difference values.

17. The method of claim 14 wherein the driving current has a waveform that approximates a sinusoidal waveform.

18. A method of operating a three-winding motor for which a DC voltage is commutated to provide a continuously variable driving current to the motor, wherein an error signal is derived from a plurality of instantaneous values of a voltage representative of motor current that are sampled while providing the driving voltage to one winding of the motor, the driving voltage having a phase that is adjusted by the error signal to align to a phase of the motor current, the improvement comprising:

selecting one of the sampled instantaneous values; and deriving the error signal based on a difference between the selected one value and each of the plurality of values.

19. The method of claim 18, wherein the selected one of the sampled instantaneous values is approximately representative of a DC component of the motor current.

20. The method of claim 18 wherein the driving current has a waveform that approximates a sinusoidal waveform.

* * * * *